United States Patent [19]
Chiang

[11] Patent Number: 5,121,459
[45] Date of Patent: Jun. 9, 1992

[54] FIBER OPTIC BUNDLE AND METHOD OF MANUFACTURE

[75] Inventor: Tom J. Chiang, West Chester, Pa.

[73] Assignee: Photon Imaging Corp., S. Plainfield, N.J.

[21] Appl. No.: 735,288

[22] Filed: Jul. 24, 1991

[51] Int. Cl.$^5$ .................. G02B 6/06; B65H 69/02
[52] U.S. Cl. .................... 385/120; 385/114; 385/116; 156/158; 156/179; 156/163
[58] Field of Search ............ 350/96.10, 96.24, 96.25, 350/96.26, 96.27, 320; 358/901; 156/158, 163, 166, 171, 174, 179, 182; 385/115, 116, 120, 114

[56] References Cited

U.S. PATENT DOCUMENTS

| | | | |
|---|---|---|---|
| 3,217,594 | 11/1965 | Simmon | 385/120 X |
| 3,607,560 | 9/1971 | Peck | 385/120 X |
| 3,644,922 | 2/1972 | James et al. | 350/96.24 X |
| 3,754,882 | 8/1973 | Van Esdonk et al. | 385/120 X |
| 4,026,693 | 5/1977 | Sato | 350/96.25 |
| 4,379,771 | 4/1983 | Snyder | 385/134 |
| 4,650,280 | 3/1987 | Selmayr | 350/96.27 |
| 4,674,834 | 6/1987 | Margolin | 385/121 X |
| 4,737,215 | 4/1988 | Stoffels et al. | 385/114 |
| 4,773,730 | 9/1988 | Sedlmayr | 350/96.27 |
| 4,786,139 | 11/1988 | Sedlmayr | 350/96.27 |
| 4,838,642 | 6/1989 | De Jong et al. | 385/120 X |
| 4,867,530 | 9/1989 | Sedlmayr | 350/96.27 |
| 4,973,128 | 11/1990 | Hodges | 385/120 X |
| 4,980,007 | 12/1990 | Ferguson | 385/114 |
| 5,061,035 | 10/1991 | Rogers, Jr. | 385/115 |

*Primary Examiner*—Brian Healy
*Attorney, Agent, or Firm*—Herbert M. Shapiro

[57] ABSTRACT

A precision glass jig is formed to properly position ribbons of optical fibers for the area end of a fiber optic bundle forming the entrance field of an optical subsystem for an electronic printer. The opposite ends of the ribbons are aligned side-by-side and coupled against an electrostatic drum. The ribbons are inserted into slots in the glass jig, each ribbon providing a bearing surface for guiding the adjacent ribbon into the respective slot. A spacing tool may be used to temporarily separate adjacent ribbons for ensuring initial alignment and also for guiding insertion of the ribbons into the slots.

9 Claims, 3 Drawing Sheets

FIBER OPTIC BUNDLE AND METHOD OF MANUFACTURE

FIELD OF THE INVENTION

This invention relates to fiber optic bundles and more particularly to such bundles which have the fibers arranged in different geometries at the first and second faces of the bundle.

BACKGROUND OF THE INVENTION

U.S. Pat. Ser. No. 4,674,834 issued Jun. 23, 1987 discloses an electronic scanner and printer which employs a fiber optic bundle. The bundle has its fibers arranged in a linear array in a first face and in an area array in a second face. In operation as a scanner, light is directed at a peper and the linear end, having a length to scan over an 8.5 inch width on the paper, is moved incrementally with respect to the paper from one linear scan position to the next. Pixels transmitted by the fibers are sensed by a sensor array optically coupled to the area face.

In operation as a printer, an array of light sources is coupled to the area face of the bundle and the linear face is optically coupled to a photosensitive medium such as an electrostatic medium. The array of light sources generates patterns of pixels which are transferred to the electrostatic medium, line-by-line, for later transfer to paper by the familiar xerographic process.

A large number of fibers are necessary in order to achieve commercially acceptable resolution using fiber optic bundles. For example, for a three hundred dot per inch resolution, for an eight and one half inch wide document, 2,550 fibers are required; for six hundred dots per inch, over 5,000 are required. It has been found that the manufacture of such fiber optic bundles is costly not only because of fiber breakage, but also because of the initialization procedure necessary to identify the relationships between the fiber ends of the two faces of a (noncherent) fiber optic bundle as explained in that patent.

Copending patent application Ser. No. 532,933 filed Jun. 4, 1990, abandoned, and assigned to the assignee of the present application discloses a fiber optic bundle which has the fiber ends arranged in a linear array in a first face and in an area array in a second face. The bundle is composed of ribbons of fibers. That is to say, each ribbon is composed of a plurality of fibers arranged next to each other. Each fiber is capable of transmitting more than one pixel. In addition, the application discloses an embodiment in which each fiber in each ribbon is a multicore fiber composed of rows and columns of fibers, each also capable of conducting light, but each of a diameter small compared to the pixel size(the light source image).

The fiber optic bundle is constructed with such ribbons by abutting ribbons in a side-by-side arrangement to form the linear face of the bundle. The area face is formed by stacking the opposite ends of the ribbons one on top of the other. Particularly if care is taken, for example, to arrange the ribbons so that consecutively numbered ribbons, for example, from left to right in the linear face, correspond to the order from bottom to top in the area face, initialization is at least simplified if not obviated because the relationships between fiber ends is ordered.

Also, breakage is reduced because ribbons are stronger and easier to handle. Still, great care is required in the construction of the bundles to ensure that the ribbons align with one another and the spacings between the ribbons are fixed and uniform. Otherwise, the bundle does not transmit an image faithfully.

BRIEF DESCRIPTION OF ILLUSTRATIVE EMBODIMENTS OF THE INVENTION

In accordance with the principles of the present invention, a rigid frame is employed to receive the ribbon ends in the area face of the fiber optic bundle. The frame may be made of many materials which, for example, may be metal, silicon, glass etc., but preferably is of glass. The frame is constructed like a ladder with the steps very close together. Further, the steps are wedge-shaped in cross section to facilitate the movement of successive ribbons between consecutive steps of the ladder.

Consecutive ribbons are inserted by movement of each ribbon axially along the next lower-ordered ribbon into the wedge-shaped opening between successive steps of the ladder. Manufacture of the fiber optic bundles is expedited, breakage is negligible and the resulting bundles are sturdy with all ribbons virtually perfectly aligned.

DETAILED DESCRIPTION OF AN ILLUSTRATIVE EMBODIMENT OF THE INVENTION

Figure 1:
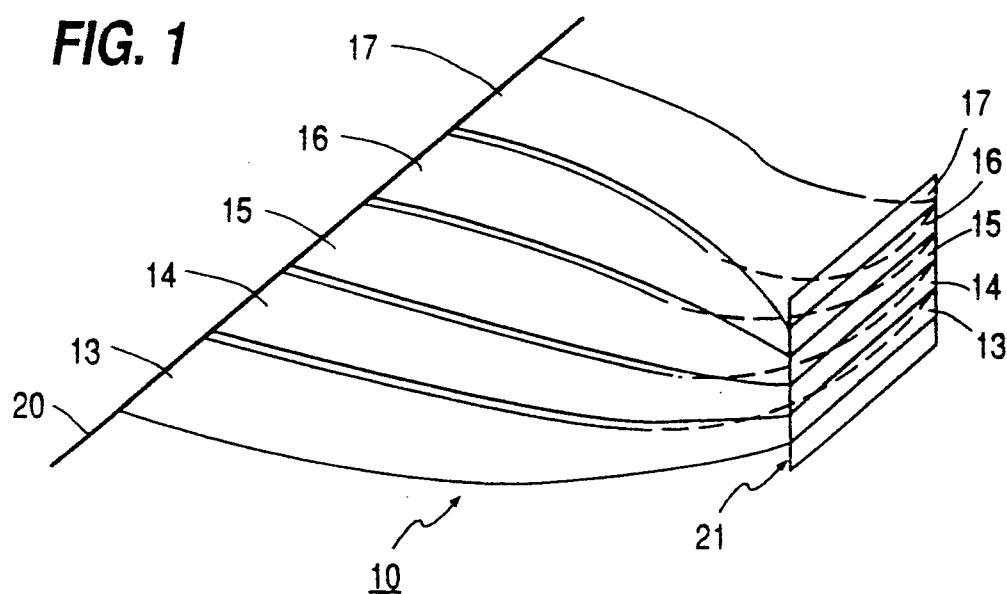
FIG. 1 is a plan view of a fiber optic bundle composed of ribbons in accordance with the principles of this invention.

FIG. 1 shows a fiber optic bundle 10 comprising a plurality of, illustratively five, fiber optic ribbons 13, 14, 15, 16 and 17. The ends of the ribbons are set in fixed positions in a side-by-side arrangement to form a linear first face as indicated at broken line 20. The dots along line 20 are to indicate fiber ends. The opposite ends of the ribbons are stacked one on top of the other to form an area face designated 21 in FIG. 1.

Only five ribbons are shown in FIG. 1. In practice 24 ribbons are empoloyed each comprising about 243 fibers. If the fibers are compound (or multicore) fibers, each compound fiber also includes, for example, a square array of 8 by 8 fibers. Each ribbon has dimensions of 9000 microns, each (multicore) fiber in a ribbon having a diameter of 80 microns and each individual core is 10 microns with a cladding of between one and three microns. If compound fibers are used, typical dimensions are 80 by 80 microns.

Figure 2:
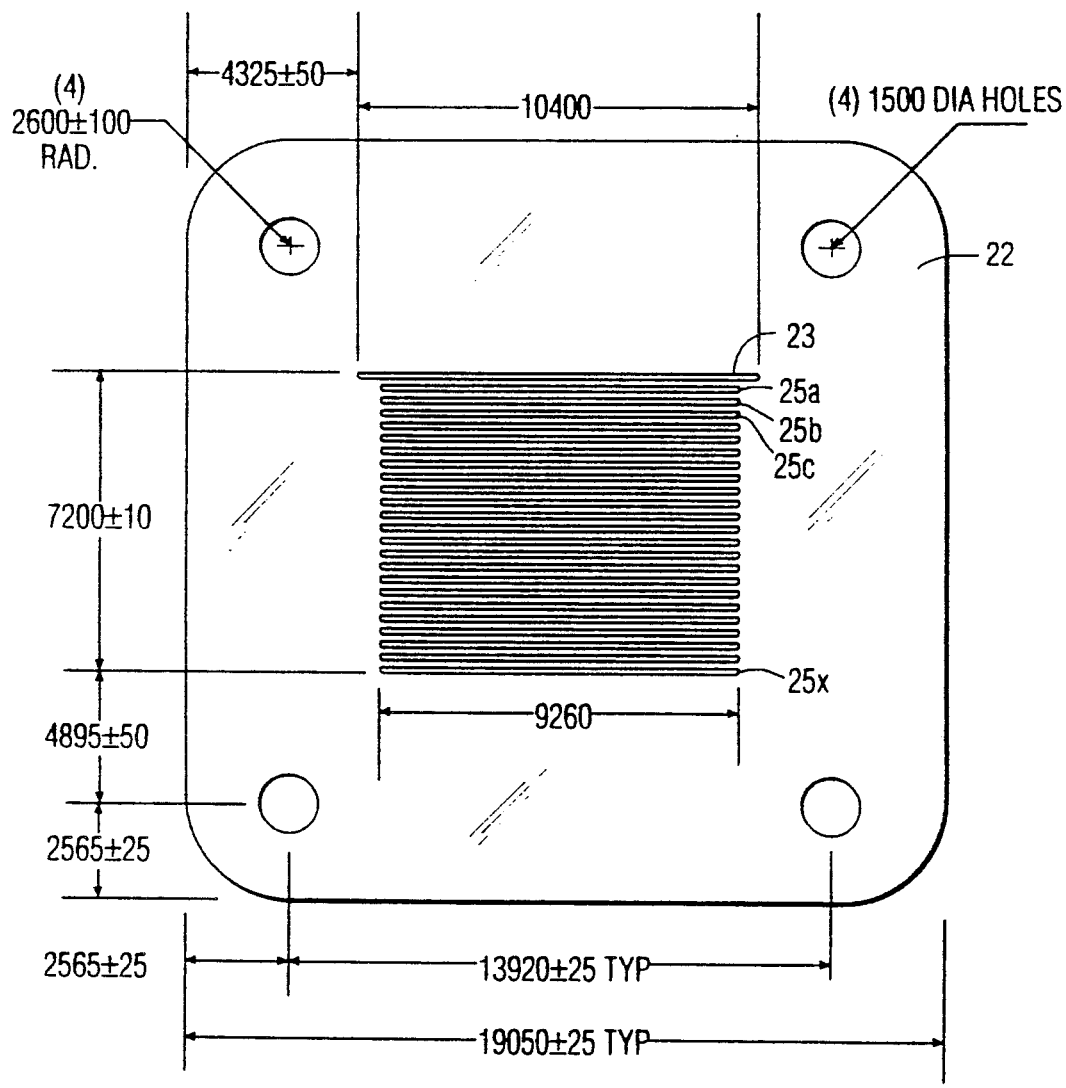
FIG. 2 is a front view of a jig or frame for forming the area face of the bundle of FIG. 1.

FIG. 2 shows a jig or frame 22 employed to receive the ribbons at face 21 of FIG. 1. The jig conventiently is made of UV-sensitive glass or glass-ceramic available from Corning under the trademark photoform ® although metal or silicon jigs have also been used. The glass is lithographically processed where a photo resist or a mask is exposed to a pattern of light and then etched to remove the exposed regions of the glass to form the frame of FIG. 2. The jig includes twenty-four slots of equal length plus a 25th slot 23 which is slightly longer as can be seen in FIG. 2. Slots 23 is nominally ten millimeter long. A relatively wider ribbon is inserted in slot 23 for providing a reference signal for synchronizing a rotating mirror in a printer system employing a linear light source array. The shorter slots 25a, 25b, 25c–25x, are 9.260+0.0254 millimeters long. All the slots are 0.095+0.010 millimeters wide on 0.300±0.003 millimeter centers. The slots thus being separated by 300 micron separators. The jig is 19.05 with a tolerance of 0.0254 millimeter wide by 13.9192 with a tolerance of 0.0254 high as is indicated in the figure. The jig is 1.65 millimeters thick.

Figure 3:
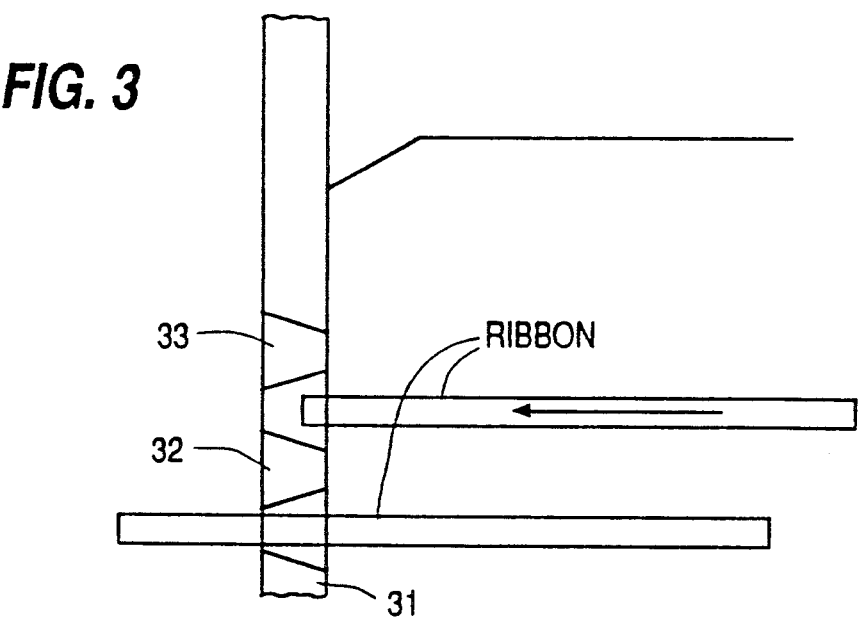
FIG. 3 is a cross sectional of a portion of the jig of FIG. 2.

The separators are wedge-shaped as can be seen in FIG. 3 (3–5 degrees). Specifically, FIG. 3 shows a cross sectional view of a portion of the jig of FIG. 2 showing illustratively three separators 31, 32 and 33. The separators are spaced apart 300 microns to the right as shown in the figure. The spacings between the centers of the separators, to the left as viewed in FIG. 3, is nominally 300 microns. Each ribbon has a thickness of 88 microns and thus easily fits within the spacing between an adjacent pair of wedges when inserted from the right in FIG. 3. The right face of a wedge is about 100 microns and thus presents virtually no obstruction to a ribbon being inserted between a pair of wedges. But a shim may be used between each ribbon. The shim is inserted from the side of the ribbon at the jig to provide a slip surface for insertion of a ribbon. Such a shim conveniently has a thickness of seven to eight mils. It has been found during fabrication, that such a shim is convenient but not necessary, each ribbon providing a suitable slip surface for the next inserted ribbon. Each ribbon is inserted into a space between separators using an edge of the frame as a bearing surface to ensure proper positioning of each ribbon.

The ribbons conveniently are stacked in the same numerical positions that they occupy in the linear face of the bundle as can be seen in FIG. 1. The ribbons, so positioned, are fixed in place by low shrinkage epoxy which has properties so that there is no tendency for the ribbons to be mispositioned bu the epoxy curing procedure. An epoxy EP301 (from EPOTEC Inc.) or Master Bond 30F has been found useful for this purpose.

Figure 4:
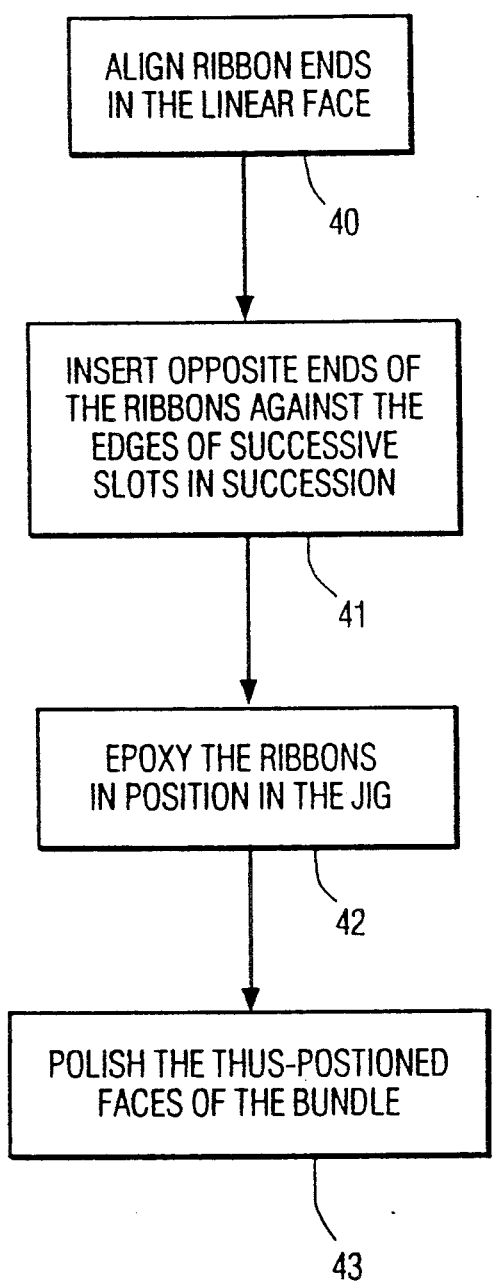
FIG. 4 is a flow diagram of the procedure for assembling the bundle of FIG. 1.

FIG. 4 shows a block diagram of the fabrication of a fiber optic bundle in accordance with the principles of this invention. Block 40 indicates that the ribbons are placed side-by-side to form the linear face of the bundle and are fixed in position typically by epoxy cement. Block 41 indicates that the opposite ends of the ribbons are inserted into the slots in a ribbon holding jig as shown in FIG. 2. Block 42 indicates that the ribbons are fixed in position by epoxy cement. Block 43 indicates that the faces of the bundle are polished so that they are eventually optically flat.

The linear face of the fiber optic bundle typically is eight and one half inches long although printers of greater widths can be made merely by adding ribbons along with a suitable enlargement of the light source, memory and control functions. An illustrative eight and one half inch document printer having a resolution of 600 dots per inch (dpi) uses 5100 fibers illustratively in twwenty-four ribbons as mentioned above.

The use of a frame to position the ribbons in the area of a fiber optic bundle permits each ribbon to be maintained in a more exact linear geometry within limits defined by the slot tolerance. Thus, any sag which might occur in the ribbons, in the absence of a frame, is not accumulative over the whole set of ribbons when a frame is used. Such an accumulation of sag was the reason for ostensibly good fiber optic bundles turning out to be inoperative.

What is claimed is:

1. Apparatus including a bundle of optical fibers, said fibers being formed into a plurality of ribbons, said bundle having a linear first face and an area second face, said ribbons being joined to one another in a side-by-side relationship to form said first face, said ribbons being stacked one on top of the other to form said second face, said second face also including a rigid frame, said frame having defined therein a plurality of separators, said ribbons at said second face being positioned between said separators, said frame along with said separators and said ribbons at said second face forming a single rigid unit.

2. Apparatus as set forth in claim 1 wherein each of said fibers is a multicore fiber.

3. Apparatus as set forth in claim 2 wherein said frame comprises a glass slide, said slide having defined therein a plurality of slots defining said separators therebetween, said slots being parallel to one another, each of said slots having dimensions to accept one of said ribbons.

4. Apparatus as set forth in claim 3 wherein said separators are dimensionally stable.

5. Apparatus as set forth in claim 4 wherein said slots are of like dimensions, said apparatus including an additional slot, said additional slot being relatively wide for receiving a relative wide one of said ribbons.

6. A method for making a fiber optic bundle having a linear face and an area second face, said method comprising the steps of forming a plurality of ribbons each comprising a plurality of optical fibers, joining said ribbons in a side-to-side relationship at first ends thereof to form a linear first face of said bundle, forming a rigid frame having a plurality of parallel slots therein adjacent ones of which are separated by dimensionally stable separators, each of said slots having dimensions to correspond to the dimensions of the second end of one of said ribbons, inserting a second end of one of said ribbons into each of said slots, fixing said second ends and said frame into a rigid unit, and polishing said second ends.

7. A method as set forth in claim 5 also including the step of positioning said second ends consecutively against successive edges of said slots which positions said ends for insertion into said slots, and advancing said ribbons consecutively into the associated ones of said slots.

8. A method as set forth in claim 7, wherein said step of positioning said second ends includes the step of temporarily inserting a planar spacing element over each inserted ribbon prior to insertion of the next adjacent ribbon into the respective one of said slots.

9. A method as set forth in claim 7 wherein said frame comprises etchable glass, said method including the steps of exposing said frame to a pattern of light for defining said separators and exposing said glass to an etchant for removing the portions thereof between said separators.

* * * * *